(12) United States Patent  
Wiener et al.

(10) Patent No.: US 11,116,343 B2  
(45) Date of Patent: Sep. 14, 2021

(54) STANDING DESK MAT

(71) Applicant: Thermogenesis Group, Inc., Bellevue, WA (US)

(72) Inventors: Ron Wiener, Mercer Island, WA (US); Andrew Rosenbaum, Mercer Island, WA (US)

(73) Assignee: Thermogenesis Group, Inc., Bellevue, WA (US)

( * ) Notice: Subject to any disclaimer, the term of this patent is extended or adjusted under 35 U.S.C. 154(b) by 0 days.

(21) Appl. No.: 15/921,846

(22) Filed: Mar. 15, 2018

(65) Prior Publication Data

US 2019/0282012 A1  Sep. 19, 2019

(51) Int. Cl.
| | |
|---|---|
| *A47G 27/02* | (2006.01) |
| *G01L 23/32* | (2006.01) |
| *G01L 23/06* | (2006.01) |
| *G01L 1/02* | (2006.01) |
| *G01L 1/16* | (2006.01) |

(52) U.S. Cl.
CPC ..... *A47G 27/0212* (2013.01); *A47G 27/0206* (2013.01); *G01L 23/06* (2013.01); *G01L 23/32* (2013.01); *G01L 1/02* (2013.01); *G01L 1/16* (2013.01)

(58) Field of Classification Search
CPC . G01L 23/06; G01L 23/32; G01L 1/02; G01L 1/16; A47G 27/0212; A47G 27/0206; B60R 21/01516; B60N 2/002
USPC .................................................. 73/862.041
See application file for complete search history.

(56) References Cited

U.S. PATENT DOCUMENTS

| | | | | |
|---|---|---|---|---|
| 5,285,022 A | * | 2/1994 | Antone | G01G 19/44 177/253 |
| 5,388,591 A | * | 2/1995 | De Luca | A61B 5/1036 600/592 |
| 6,063,046 A | * | 5/2000 | Allum | A61B 5/1036 600/595 |
| 6,085,697 A | * | 7/2000 | Fuchs | A22B 1/00 119/843 |
| 6,119,530 A | * | 9/2000 | Oddsson | A61B 5/00 73/862.42 |
| 6,870,477 B2 | * | 3/2005 | Gruteser | A47C 15/004 340/3.1 |
| 7,381,152 B2 | * | 6/2008 | Couvillion, Jr. | A61M 16/0465 482/51 |
| 7,900,523 B2 | * | 3/2011 | Kogure | A61B 5/1036 73/862.041 |
| 7,938,751 B2 | * | 5/2011 | Nicolas | A63B 23/0458 482/1 |

(Continued)

*Primary Examiner* — Octavia Hollington  
(74) *Attorney, Agent, or Firm* — Sheridan Ross P.C.

(57) ABSTRACT

Standing desks, such as fixed work surfaces or height-adjustable desks or computer/workstation supports, provide relief from computer or other desk work that might otherwise force a user to remain seated. However, concerns about utilization and comfort are points of resistance to standing desks. A "smart" pressure sensing mat is provided that may provide additional cushioning and comfort as well as a source of data input for record keeping, usage verification, user identification, and control signals. Signals may be utilized to report data (e.g., utilization, user operations, functions, etc.) and/or control components (e.g., trigger a standing desk to rise for standing use or lower for seated use, activate lights, etc.).

20 Claims, 11 Drawing Sheets

(56) References Cited

U.S. PATENT DOCUMENTS

| | | | | |
|---|---|---|---|---|
| 8,339,371 | B2* | 12/2012 | Soto | G05G 9/047 |
| | | | | 273/108.3 |
| 8,613,678 | B2* | 12/2013 | Nusbaum | A63B 69/36 |
| | | | | 473/278 |
| 8,675,018 | B2* | 3/2014 | Mishra | B65G 13/10 |
| | | | | 345/629 |
| 8,810,424 | B2* | 8/2014 | Garcia | F24C 7/08 |
| | | | | 219/445.1 |
| 9,212,814 | B2* | 12/2015 | Puljan | F21V 33/004 |
| 9,485,839 | B2* | 11/2016 | Kiser | H05B 37/0227 |
| 9,486,070 | B2* | 11/2016 | Labrosse | A47B 21/02 |
| 9,949,640 | B2* | 4/2018 | Horseman | A61B 5/6887 |
| 10,021,530 | B2* | 7/2018 | Sigal | H04W 4/043 |
| 10,477,355 | B1* | 11/2019 | Niranjayan | E04F 15/02405 |
| 10,496,155 | B2* | 12/2019 | Schwarz | G06F 3/011 |
| 10,801,166 | B2* | 10/2020 | Trilling | A61H 3/066 |
| 2006/0152378 | A1* | 7/2006 | Lokhorst | G08B 21/22 |
| | | | | 340/666 |
| 2009/0186698 | A1* | 7/2009 | Ludden | A63F 13/06 |
| | | | | 463/37 |
| 2011/0132276 | A1* | 6/2011 | Lanny | A01K 1/0613 |
| | | | | 119/751 |
| 2011/0245732 | A1* | 10/2011 | Mravyan | A61B 5/447 |
| | | | | 600/587 |
| 2012/0253233 | A1* | 10/2012 | Greene | G16H 50/30 |
| | | | | 600/592 |
| 2012/0309531 | A1* | 12/2012 | Gong | H03K 17/955 |
| | | | | 463/36 |
| 2013/0116852 | A1* | 5/2013 | Dijk | G06F 3/011 |
| | | | | 700/301 |
| 2014/0195023 | A1* | 7/2014 | Statham | A61B 5/1038 |
| | | | | 700/91 |
| 2016/0242719 | A1* | 8/2016 | Yorkston | A61B 6/107 |
| 2016/0374618 | A1* | 12/2016 | Giovangrandi | A61B 5/282 |
| | | | | 600/393 |
| 2017/0013415 | A1* | 1/2017 | Sigal | H04L 67/24 |
| 2017/0028258 | A1* | 2/2017 | Liu | A63B 21/4037 |
| 2017/0089775 | A1* | 3/2017 | Hsu | G01L 1/16 |
| 2017/0177833 | A1* | 6/2017 | Lewallen | G06F 19/3481 |
| 2017/0196195 | A1* | 7/2017 | Wisdom | A01K 1/035 |
| 2018/0125413 | A1* | 5/2018 | Smith, Jr. | G08B 21/22 |
| 2019/0285389 | A1* | 9/2019 | Alexandre | G06F 3/04144 |
| 2020/0394367 | A1* | 12/2020 | Fleetwood | G07G 1/0072 |

* cited by examiner

STANDING DESK MAT

FIELD OF THE DISCLOSURE

The present disclosure is generally directed toward sensing electronics and related systems.

BACKGROUND

Pressure mats are known systems whereby a component is provided in a deformable body to indicate occupancy or a lack of occupancy. Pressure mats are often utilized in situations where safety is an issue, such as to ensure a worker is standing in a designated location before a machine is enabled to operate. Alternatively, pressure mats are utilized to trigger door openers or other equipment upon detection of an occupant.

The use of standing desks continues to increase in popularity. Many organizations utilize wellness managers to promote the health and safety of their workers, which more and more frequently includes the use of standing desks. Wellness managers may have to decide whether purchasing standing desks, or selecting other option, would provide the greatest benefit. For example, wellness managers may know that company-provided gym memberships have a particular utilization rate. Similarly, if sit-stand desks were to be provided to workers, how often and for what duration would they be used in the standing configuration? Without being able to answer that question, wellness managers may select one of the other options and deny their workers the opportunity to improve their wellbeing while they work.

Workers, such as in a pilot program, could be asked about their utilization. However, workers may forget or resist additional reporting tasks or, if reported, may or may not accurately report their use. Similarly, a pressure mat may be able to determine that something is on the mat associated with a particular location, however pressure mats may report occupancy when the occupant is a box or leg of a chair.

SUMMARY

Wellness managers and other personnel responsible for making wellness purchasing decisions may be reluctant to purchase standing desks or sit-stand desks due to a lack of verifiable usage data. In contrast, gym membership utilization can be determined by monitoring equipment use, badge scans, or other well-known means. However, gyms may be intimidating or their use postponed until "when I have the time," for many workers. Being able to spend at least a few minutes standing at work may provide benefits to many workers who may otherwise not take advantage of other wellness opportunities or to supplement the activities they do utilize. As insurance companies, wellness managers, and others incentivize healthful activities, some may be tempted to game the system. For example, a company owned gym may require badge-scans as a means to monitor participation in wellness activities, such as exercising at the gym, but some may be tempted to scan their badge and leave without performing any exercises. Standing versus sitting may be incentivized, however, self-reporting time spent standing may not be an accurate representation of actual time spent standing. A pressure mat may be able to determine that something is on a mat, but if that "something" is a person standing, a wheel of a chair, or a box, requires more than a pressure mat.

It is with respect to the above issues and other problems that the embodiments presented herein were contemplated.

As an overview, and in one embodiment, a pressure sensing mat (or, more simply, "mat") is provided. The mat provides data as received from pressure sensing or other sensing components to report data to and/or trigger other systems in response to a particular use. The mat preferably provides comfort and otherwise promotes use, such as for standing upon while a user is at a standing desk or utilizing a sit-stand desk in a standing configuration.

In one embodiment, a system is disclosed, comprising: a pressure sensing mat comprising a plurality of sensing portions; a processor; a component configured to communicate with the processor; and wherein the pressure sensing portions provide signals to the processor in accord with a received pressure and location of the pressure on the pressure sensing mat; wherein the processor receives the signals from the plurality of pressure sensing components and further determines an indicia of use and output the indicia of use to the component and wherein the indicia of use comprises an indication of whether the pressure sensing mat is being used by a user that is standing on the pressure sensing mat; and the component provides a first response, when the indicia of use indicates the user is standing and a second response, when the indicia of use does not indicate standing.

In another embodiment, a pressure sensing mat is disclosed, comprising: a communication interface to a network; a supporting structure; a pressure sensing component supported by the supporting structure and configured to provide signals in accord with a received pressure and location of the pressure on the pressure sensing mat; a processor to receive the signals from the pressure sensing component and determine an indicia of use, from the signals, and output the indicia of use via the communication interface; and wherein the indicia of use comprises an indication of whether the pressure sensing mat is being used by a user that is standing on the pressure sensing mat.

In another embodiment, a method is disclosed, comprising: detecting pressure on a pressure sensing mat; analyzing signals from portions of the pressure sensing mat; outputting, from the pressure sensing mat, indicia of use associated with standing use, upon the analyzed signals indicating the pressure sensing mat is being utilized by a standing user, and non-standing use, upon the analyzed signals indicating the pressure sensing mat is not being utilized by a user while standing; and reporting the indicia to a component.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed.

Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known to as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
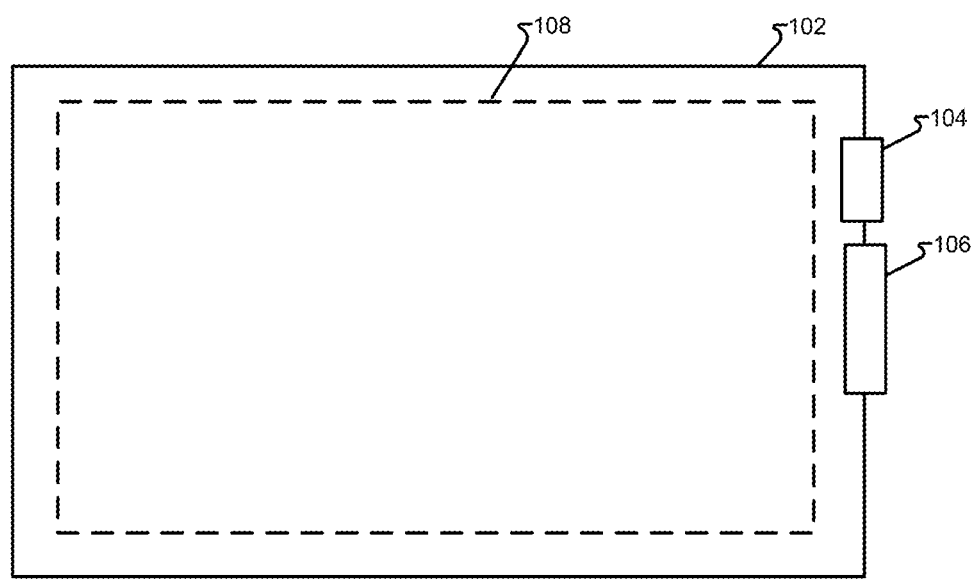
FIG. 1 depicts a mat in accordance with embodiments of the present disclosure.

FIG. 1 depicts mat 102 in accordance with embodiments of the present disclosure. In one embodiment, mat 102 comprises pressure sensing area 108. Mat 102 may provide cushioning, ridges, or other physical features to promote comfort and use. Pressure sensing area 108 comprises a plurality of pressure sensing components and/or pressure sensing areas and may utilize communication interface 106 to send and/or receive data to other components, which will be described in greater detail with respect to the embodiments below. In another embodiment, power control component 104 receives electrical power from an electrical plug to a power source and/or battery (not shown). Power component 104 may comprise a switch to selectively activate/deactivate power consuming components of mat 102. Power component 104 may be omitted when electrical power is provided by communication interface 106 (e.g., power-over-ethernet, USB, etc.).

In another embodiment communication interface 106 comprises a communication interface for wired and/or wireless communications to other components (e.g., Wi-Fi, Bluetooth, ethernet, USB, near field communications, etc.). Although mat 102 is depicted as rectangular in shape, it should be appreciated that other geometries may be utilized without departing from the scope of the disclosure herein.

In another embodiment, mat 102 may perform, at least in part, operations similar to those of a touch pad. For example, a user may provide inputs in the form of a particular gesture, tapping pattern, or touch a particular location within sensing area 108. Mat 102 may then provide the signals, such as raw signals (e.g., voltage or other reported value from one or more pressure sensing components) and/or a signal providing a determined meaning (e.g., vacant, occupied, standing user, occupied by non-standing user, etc.), to another component. Such signals may indicate distress, comprise an authentication, or initiate a particular operation. For example, a user at a bank may have a particular tapping pattern that indicates distress to alert security personnel, a user may be authorized to omit a conventional password or utilize a simplified password if they perform a certain gesture, such as perform two taps on the left portion of mat 102 and then a sweeping motion to the upper right corner, as a means of authentication. As will be described in more detail with respect to certain embodiments that follow, mat 102 may be utilized with a powered or unpowered sit-stand desk or computer workstation support. Accordingly, tapping a particular "hotspot" of mat 102 or performing a pre-determined gesture may trigger a powered sit-stand desk or support to transition from seated use to standing use or vice versa. Optionally, mat 102 may incorporate one or more of heat, massage, ventilation, haptic feedback, sound, lights, or other input, output, or usability features.

Figure 2:
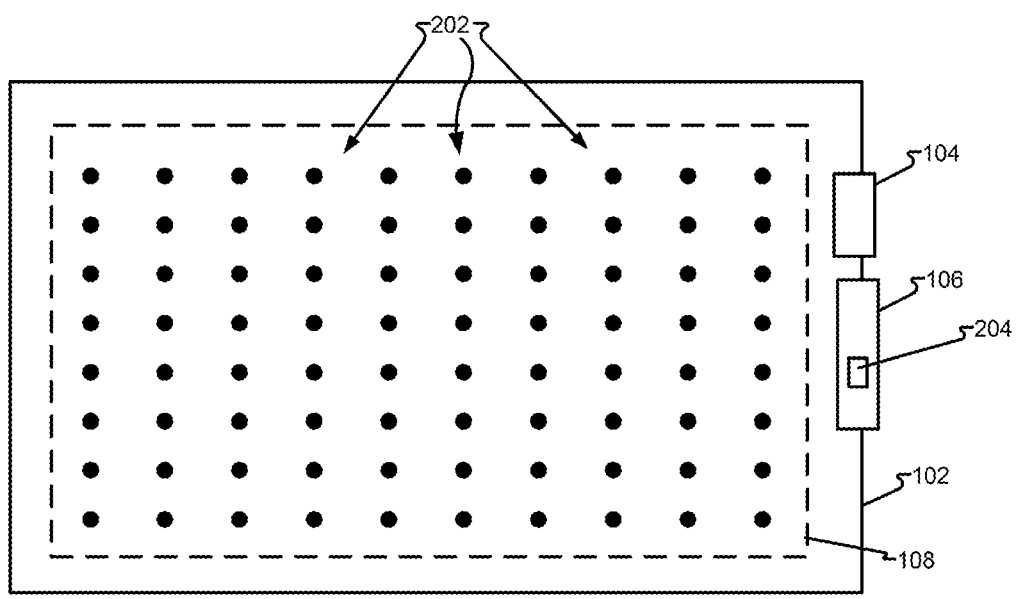
FIG. 2 depicts the mat comprising a first configuration of sensing components in accordance with embodiments of the present disclosure.

FIG. 2 depicts mat 102 comprising a configuration of sensing components 202 in accordance with embodiments of the present disclosure. In one embodiment, sensing components 202 are uniformly provided within pressure sensing area 108. Each of sensing components 202 provides an output which may be further provided as a raw signal from each component via communication interface 106 and/or aggregated or otherwise processed via processor 204 performing operations to combine, modify, aggregate, or otherwise process the data from one or more of sensing components 202. In another embodiment, communication interface 106 comprises an output, such as a speaker, LED, haptic, etc. such as may be perceived by a user. In a further embodiment, communication interface 106 may comprise processor 204 performing operations that translates signals received upon ones of sensing components 202 as commands. For example, a particular tapping pattern or a particular gesture traced out by a user's foot within sensing area 108 may be interpreted as a command input. In another embodiment, processor 204 may detect a failure of one or more of sensing components 202. For example, one of sensing components 202 may be "stuck" and continuously report a particular pressure. Processor 204 may exclude data from the stuck one of sensing components 202 or provide an alternative value in place of the "stuck" data value, such as duplicating a value of a neighboring one of sensing components 202 or an average or extrapolated value of a plurality of neighboring ones of sensing components 202.

Sensing components 202 are variously embodied. Sensing components 202 may provide a heterogeneous or homogenous collection of types and/or sensitivities for ones of sensing components 202. Sensing components 202 may comprise pressure sensing (e.g., pneumatic, piezoelectric, etc.), presence (e.g., capacitive, inductive, etc.), and/or obscured (e.g., photosensor, photo transducer. etc.). However, while utilization of sensing components 202 that comprise detecting whether or not ones of sensing components 202 are obscured may be utilized, at least in part, the embodiments herein, unless otherwise specified, are directed to sensing components 202 that provide an output indicating a pressure level, amount, or indicia to a processor, such as processor 204, or to a processor of a component in communication with mat 102 via communication interface 106.

In another embodiment, mat 102 may be utilized with one or more discrete components to provide additional or alternative physical properties. For example, mat 102 may provide substantially no padding and be attached to a padding component. In another example, mat 102 may be place on top of or underneath a carpet, rug, ridged pad, etc. Accordingly, mat 102 may incorporate a calibration operation. Processor 204 and/or another processor or computing system in communication with mat 102 via communication interface 106 may prompt a user to perform calibration actions (e.g., step on, step off, etc.) and thereby associate signals produced by sensing component 202 with a user or a particular user. Calibration may be prompted periodically or upon sensing an event, such as dissimilar signal from sensing component 202, such as to determine whether mat 102 is being utilized by a different user or if it has been moved and is now being utilized on a different surface (e.g., carpeted floor to wood floor). A user-event may also prompt calibration. Additionally or alternatively, communication interface 106 may comprise a speaker, LED, or other input-output component to prompt a user to perform calibration activities without requiring another component, such as a computer, smart phone, etc., utilizing an application to communicate with mat 102 via communication interface 106.

Figure 3:
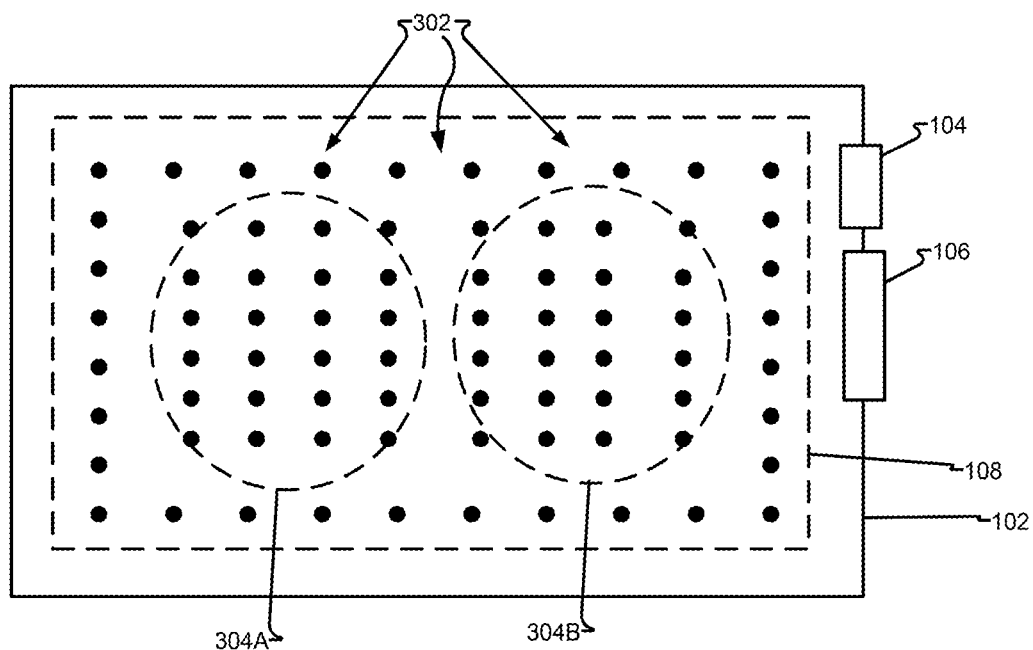
FIG. 3 depicts the mat comprising a second configuration of sensing components in accordance with embodiments of the present disclosure.

FIG. 3 depicts mat 102 comprising a configuration of sensing components 302 in accordance with embodiments of the present disclosure. In one embodiment, sensing components 302 are distributed heterogeneously within sensing area 108, such as having a greater concentration within areas 304A-B, such as may be utilized more extensively by a user standing as compared to sensing components 302 outside of areas 304A-B. As a benefit, mat 108 may provide a greater resolution associated with usage as without the need to add excessive sensing components 302 within sensing area 108 that see infrequent or irrelevant usage (e.g., usage while a user transitions to or from standing, but not utilized while standing). It should be appreciated that other distributions may be provided for sensing components 302 without departing from the scope of the disclosure provided.

Figure 4:
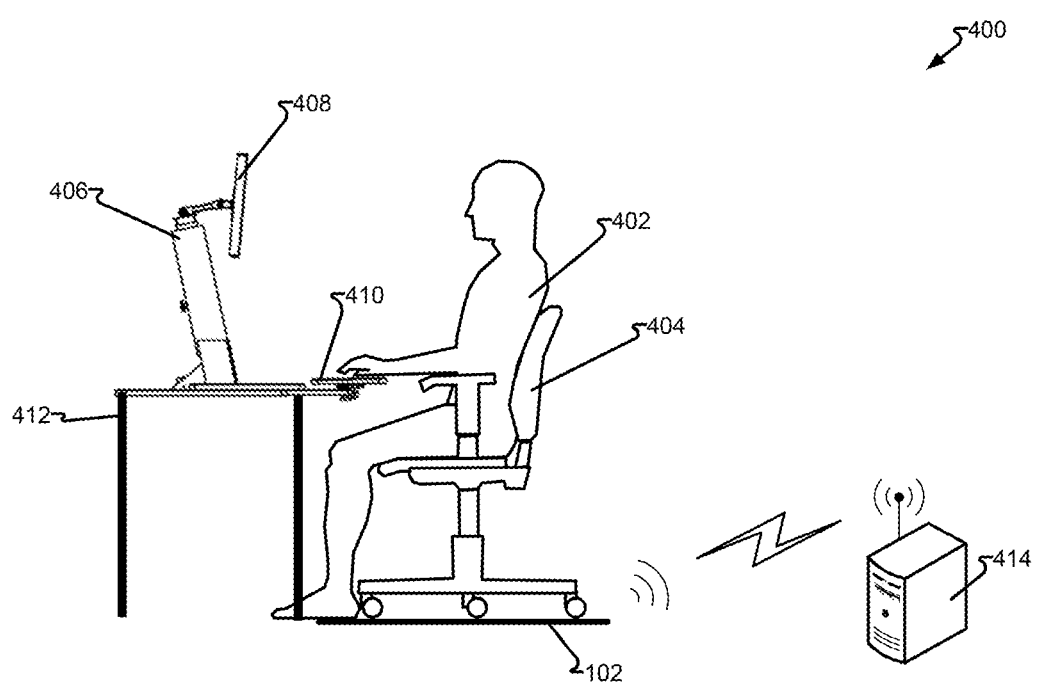
FIG. 4 depicts a first mat usage environment in accordance with embodiments of the present disclosure.

FIG. 4 depicts mat 102 usage environment 400 in accordance with embodiments of the present disclosure. In one embodiment 400 comprises user 402 seated in chair 404 which is located, partially or entirely, upon mat 102. User 402, is seated, such as to engage sit-stand desk 412, comprising support 406, monitor 408, and devices placed upon keyboard/mouse tray 410. Desk 412 may comprise height-adjusting powered legs to elevate the worksurface of desk 412 or be stationary but comprise a height adjusting structure, such as support 406 and monitor 408 and/or keyboard/mouse tray 410 attached to support 406. Mat 102 may communicate, such as via a wireless connection, to computer 414. Computer 414 may be a dedicated device solely monitoring mat 102 or a collection thereof for an associated collection of users 402. In another embodiment, computer 414 may provide a workstation for user 402 and thereby provide other computing and communication services User 402 and chair 404 contacts mat 102 via a number of points. User 402 would have the bulk of their weight distributed across each of the wheels, pads, or legs of chair 404. A trivial portion of weight would be provided by the feet of user 402 or other contact points. Accordingly, computer 414 and/or processor 204 may monitor mat 102 by receiving outputs from sensing components 202, 302.

Figure 5:
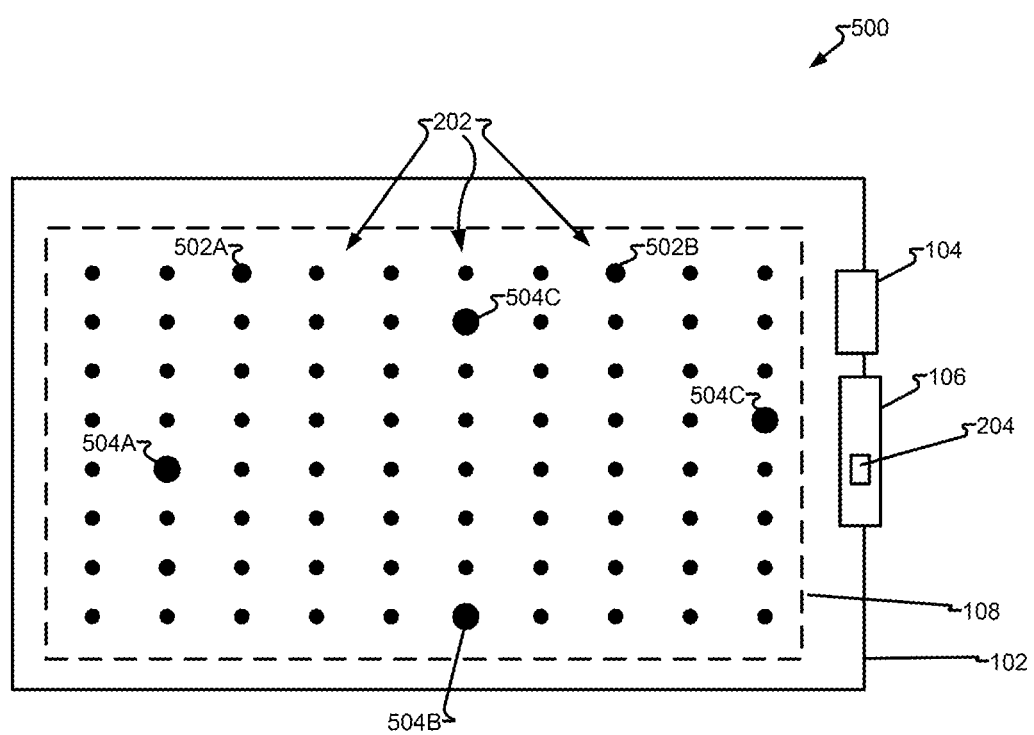
FIG. 5 depicts the mat as used in the first mat usage environment in accordance with embodiments of the present disclosure.

FIG. 5 depicts mat 102 with sensing components 202 in accordance with embodiments of the present disclosure. In one embodiment, sensing components 202 are depicted as different sizes to indicate dissimilar pressure signal outputs, such as those detected when utilized in environment 400. For example, chair legs (e.g., contact points of chair 404) on mat 102 may cause portion 504 of sensing components 202 to provide greater input values, portion 502 of sensing components 202 may provide an increased output value (less than portion 504, greater than sensing components 202 not identified as 502 or 504). Accordingly, processor 204 and/or computer 414 may determine a plurality of contact points exist associated, at least in part, with usage of chair 404.

In other embodiments, chair 404 may comprise one contact geometry (e.g., pedestal), two contact points (e.g., "skid" type chairs), or three or more legs or wheels providing a non-zero number of contact points. Should zero contact points be detected, processor 204 and/or computer 414 may determine mat 102 is unoccupied. Seated humans, such as user 402, are known to provide a substantially uniform pressure with respect to those contact points accounting for the majority of the weight of user 402 and/or chair 404. Portion 502, which accounts for a trivial portion of the weight provided by user 402 in a seated configuration, may vary in terms of position and/or force measured. However, such motion may be discounted for points associated with a below-threshold amount. For example, if portions 502 account for ten pounds, while the aggregate of portion 504 accounts for two-hundred pounds (e.g., weight of user 402 and chair 404), processor 204 and/or computer 414 may then conclude portion 502 represent a user not standing (e.g. user 402). Additionally, portion 504 may move linearly in unison or rotate around a point upon mat 102. Based on at least the forgoing, user 402 may be determined to be seated.

Figure 6:
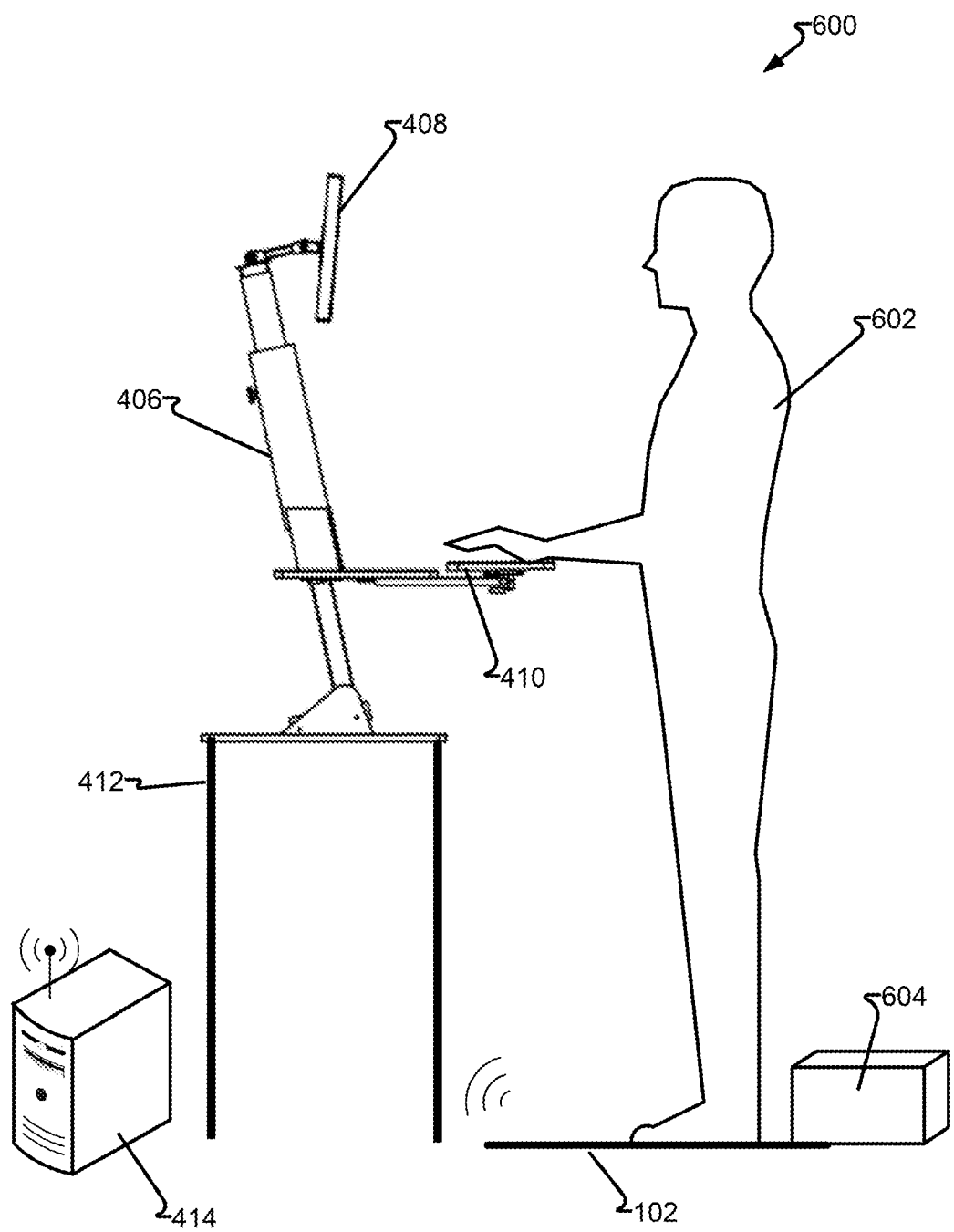
FIG. 6 depicts a second mat usage environment in accordance with embodiments of the present disclosure.

FIG. 6 depicts mat 102 usage environment 600 in accordance with embodiments of the present disclosure. In one embodiment, user 502 is standing on mat 102 while using sit-stand desk 412 in a standing configuration. Mat 102, via processor 204 and/or computer 414, receiving inputs from sensing components 202. Mat 102 will then determine user 502 is standing. In another embodiment, mat 102, while in use by standing user 502 may comprise static non-zero readings from a subset of sensing components 202, such as due to box 604.

Figure 7:
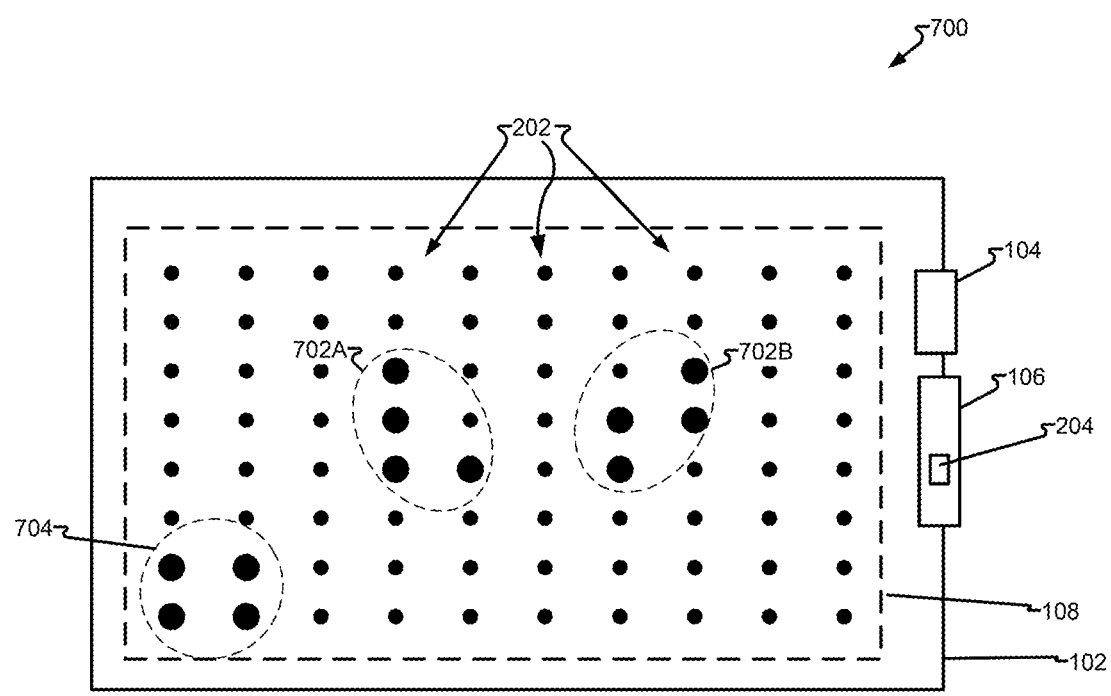
FIG. 7 depicts the mat as used in the second mat usage environment in accordance with embodiments of the present disclosure.

FIG. 7 depicts mat 102 with sensing components in accordance with embodiments of the present disclosure. In one embodiment, sensing components 202 are depicted as different sizes to indicate dissimilar pressure signal outputs, such as those detected when utilized in environment 600. Portion 702 may result from user 502, in a standing configuration, and providing pressure to at least a portion of sensing components 702A-B. Additionally or alternatively, portion 704 may result from box 604. It should be appreciated that a portion of a chair (e.g., chair 404) or other object may provide inputs resulting in portion 704.

It should also be appreciated that the number and/or distribution of sensing components 202 may be varied as a matter of design choice. As depicted in environment 700, user 502 is detected by some, but less than all, sensing components within portions 702A and 702B. Had additional sensing components been deployed within portions 702A and/or 702B, the geometry may be more foot or shoe-like, however, while denser placement of sensing components 202 may provide for a more precise image or may have other advantages, providing such a high resolution is not a requirement. In one embodiment, imaging provided by sensing components 202 reporting dissimilar pressures may be provided with as few as one of sensing component 202 reporting an additional pressure and one of sensing component 202 reporting an absence of additional pressure.

Figure 8:
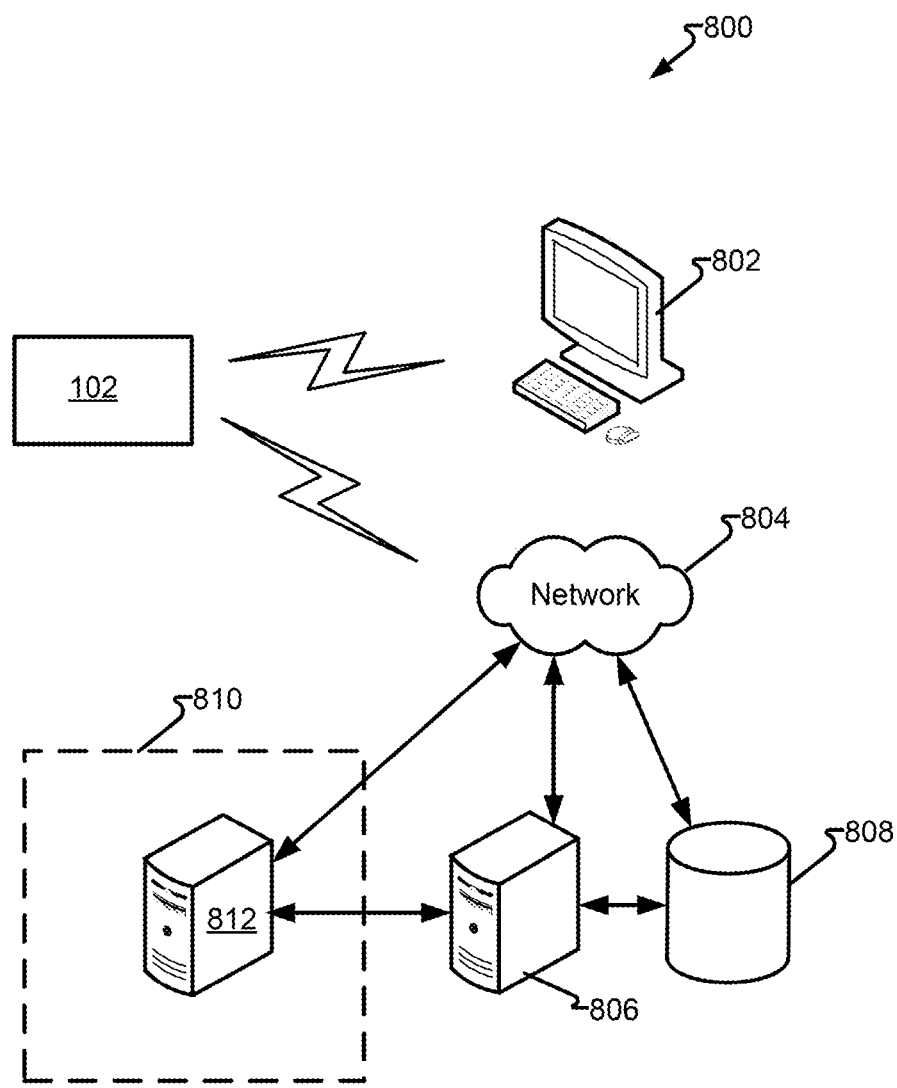
FIG. 8 depicts a system in accordance with embodiments of the present disclosure.

FIG. 8 depicts system 800 in accordance with embodiments of the present disclosure. In one embodiment, mat 102 provides data signals of individual values for one or more sensing components 202 and/or processed values, such as from processor 204, for one or more sensing components 202. Data signals may be provided to local workstation 802, such as utilized by user 402 and/or 602 or a wellness manager or other personnel, which may be a dedicated device only monitoring one or more mats 102 or providing additional functionality (e.g., work processing, spreadsheets, communications, etc.), such as when workstation 802 is embodied as computer 414 in whole or in part. Additionally or alternatively, mat 102 may provide data signals, via network 804, to one or more of server 806 or database 808. As a further option, data signals may be provided and/or received from optional devices 810, which may include server 812 or other components (e.g., controllers, actuators, switches, relays, routers, etc.). In a further embodiment, data signals may utilize workstation 802 to connect to, and communicate via, network 804. It should be appreciated that additional or fewer components, or different configurations thereof, may be utilized to receive data signals, directly or indirectly and/or raw signals (e.g., readings from ones of sensing components 202) or processed data signals, without departing from the scope of the embodiments. Network 804 may comprise wired/wireless networks and may further comprise, in whole or in part, one or more networks such as the Internet, telephony, cellular, ethernet, Wi-Fi, Bluetooth, etc.

In one embodiment, data signals are received by a component, such as workstation 802 or other component comprising a data reception interface and/or network interface and at least one processor. Workstation 802, server 806, and/or processor 204 may receive data signals and provide additional processing. In one embodiment, workstation 802 determines if mat 102 is occupied or unoccupied. The determination of whether mat 102 is occupied or not is variously embodied and may comprise determining if the aggregate data signals provided by mat 102 indicate a weight that could be a human user. For example, mat 102 may indicate an aggregate detected weight is three pounds and, accordingly, may be due to an object, inaccurate readings from one or more sensing components 202, or other non-occupied cause. One target environment of mat 102 is for use by adults in the workforce, however, other environments, such as grade schools are also contemplated. As a result, the users of mat 102 may vary greatly in weight. However, certain minimum values, which may be further selected based upon a factory, administrator, or user configuration may be set and, any aggregate weight upon mat 102 that is below such a threshold value will be considered to be absent occupancy. While such a determination may be conclusive of a lack of occupancy, a detected weight above a minimum threshold may be insufficient to conclude occupancy. Accordingly, in additional or alternative embodiments, additional processing may be provided.

In another embodiment, sensing components 202 may detect static or dynamic variations in pressure and provide a corresponding output. The timeframe for which a determination of whether or not a data signal output by one or more sensing components 202 is considered static is variously embodied. The timeframe may be dynamically varied depending on the type of variations encountered. For example, a subtle swaying, whereby overall weight remains substantially constant, but increases with regard to sensing components 202 in one portion, such as portion 702A (e.g., detecting pressure from one foot) while decreasing with regard to sensing components 202 in another portion, such as portion 702B (e.g., detecting pressure from a different foot). Such subtle swaying may result in a dynamic signal over a short timeframe, such as less than 5 seconds. Additionally, the number of variations may be considered. In another embodiment, occupancy on mat 102 may be discarded entirely if observed for less than another threshold period of time. User 602 may stand on mat 102 for less than five minutes, as an example, and be considered an inconsequential occupancy and discarded as if there were no occupancy at all. Accordingly, outlier pressure readings from any one or combination of sensing components 202 that may indicate occupancy, but only last for less than a minimum threshold of time, such as a few seconds up to a few minutes, may be the result of another object (e.g., an object being dropped on or traversing mat 102) or an inconsequential usage of such a short duration that any health benefits gained are so minor than they may be discarded.

In another embodiment, the number and size of portions of sensing components 202 reporting pressure indicating occupancy may be evaluated. Humans, will generally stand on two feet and produce two distinct portions of sensing components 202 indicating occupancy (e.g., portions 702A and 702B). The density of sensing components 202 and/or attribute of a standing user (e.g., standing with feet close together, amputee, etc.) may produce a single contact area. However, sway, aggregate detected weight above a threshold, shuffling, etc. will cause variations in the particular ones of sensing component 202 reporting pressure and/or the amount of pressure detected. Additionally or alternatively, standing user 602 may utilize a can, walker, or other standing device. Much like portion 704 of sensing components 202 reporting occupancy, if static, such as when the cane or walker is freestanding while the user is engaging with standing desk 412 or box 604 produces static portion 704, such static portions may be omitted from consideration. However, if such portions are not static (e.g., user 602 is utilizing a cane or walker while utilizing desk 412) then user 602 may be determined to be standing whether or not two or more portions of contact are detected.

However, not all dynamic pressure outputs are associated with standing use of mat 102. In another embodiment, a portion of sensing components 202 may indicate a path which may terminate, originate, or be maintained on mat 102. Such a path does not indicate standing use of mat 102 and may be caused a wheel of a chair or other object passing over mat 102. Accordingly, in another embodiment, dynamic changes in the number or indicated amount of sensing components 202 reporting pressure, when the pressure indicates a traversal path, may be considered a non-standing use of mat 102 and/or traversal by a wheel of a chair or other object. Accordingly, even if the detected object remains on mat 102, which may further be dynamic, such as when seated user 402 fidgets or provides other oscillations to mat 102 while seated. Therefore, portion 504 of sensing components 202 may be identified, via their traversal, as associated with non-standing use and even subsequent dynamic pressures may be considered a non-standing use.

Additionally or alternatively, seated user 402 may place their feet on mat 102 without a chair or other object being on mat 102. Portion 502 may detect occupancy and/or feet/shoes, such as when the density of sensing components is sufficient to indicate a feet/shoe geometry thereon. However, portion 502 are merely the feet of seated user 402. Sensing components 202 may indicate an aggregate weight across all sensing components 202 or only sensing components 202 associated with feet (e.g., portions 502A-B) to determine if a minimum weight is provided to indicate standing at a position associated with portions 502A-B. Additionally or alternatively, certain sensed activity of portions 502A-B may indicate a lack of standing. For example, standing user 602, even if swaying, jumping, etc. will provide an aggregate pressure indicating their weight when measured over a relatively short period of time as even a user jumping or otherwise moving on mat 102. Similarly, a swaying standing user 602 may reduce pressure on one foot while the add it to the other. A front-back sway can similarly be determined to be standing as pressure within a portion (e.g., portion 702A) will remain constant on the aggregate as individual sensing components 202 detect the variations within.

In contrast, seated user 402 may lift or otherwise shift their weight from of one foot without adding the corresponding decrease to the other foot. A feat that can be performed over a very short time (e.g., jumping, falling, etc.) by standing user 602 or routinely and/or indefinitely by seated user 402. If outlying observations are ignored, such as those occurring a single time and/or for a short duration (e.g., one minute, a few seconds or less) then user 602, even if falling or jumping may be determined to be standing while the reoccurrence of such observations for seated user 402 may indicate seated use of mat 102 and/or an absence of standing use of mat 102.

With usage of mat 102 determined (i.e., standing use or seated use) by workstation 802, server 806, and/or processor 204, additional operations may then be performed. In one embodiment, identification of a particular user may be provided. Profile information may be maintained, such as in database 808 or a memory associated with processor 204, computer 414, and/or workstation 802. Profile information may include information such as time/day of use and/or attributes of a particular user (e.g., weight, sway pattern, etc.). Accordingly, sensing components 202 may determine a particular pattern and/or amount of aggregate and/or individual pressure, oscillations, etc. and determine the identity of a user. However, conventional identification (e.g., sign-in, badge swipe, etc.) may be utilized as an alternate or additional means of authentication, such as to provide a more secure and/or more certain identification of a specific user.

In another embodiment, data recording may indicate utilization of standing to indicate use of a standing desk or sit-stand 412 in a standing configuration over one or more periods of time. For example, use of a particular asset (e.g., sit-stand desk 412) may be utilized in a standing configuration 39% of the time in the last month, 31% of the time the previous month, etc. User 602 stood for 29 hours last week, 35 hours the week before, etc. While data gathering and reporting are useful, other operations may be provided once it is known whether mat 102 is occupied and/or occupied in either for standing use or seated use.

In another embodiment, any occupancy of mat 102 may be utilized as a trigger to other systems or components. In other embodiments, occupancy in one of seated or standing or a transition (e.g., seated to standing, standing to seated, vacant to occupied, vacant to seated and/or standing, occupied to vacant, etc.) may be utilized as the trigger. For example, detecting a transition from unoccupied to occupied may signal optional devices 810, when embodied as heat, cooling, fan, lighting, etc., to operate in accordance with an occupied area. Similarly, a transition to unoccupied may cause optional devices to transition to an unoccupied mode of operation (e.g., turn off some or all lights, reduce heating/cooling, etc.). Computer 414 and may be configured to, at least partially, operate differently whether utilized by a standing or seated user as well as perform operations for a transition. For example, computer 414 may detect a transition from occupied to unoccupied and lock, enter a low-power mode, or other operation associated with an absence of a user.

Conversely, transitioning from an unoccupied to an occupied state may "wake" computer 414, such as to terminate a low-power mode of operation or perform other operation more conducive to being utilized rather than being unused by a user. Furthermore, knowledge of a specific user, either by identifying attribute (e.g., sign-in, weight, etc.) or by estimation (e.g., last user) may cause computer 414 to perform certain operations with such knowledge or assumed knowledge. For example, the user who comes in at 8:00 AM Monday-Friday typically uses sit-stand desk 412 in a standing configuration, therefore, when occupancy upon mat 102 is detected at 7:53 AM on a Tuesday, computer 414 which may further comprise a controller for support 406 and/or powered height-variable legs of desk, such as an actuator (not shown) of desk 412, to cause the worksurface to raise or otherwise accommodate standing use without requiring any further input or action to adjust the desk. Similarly, if a user is determined to utilize desk 412 in a seated configuration at 1:00 Monday-Friday, then support 406 and/or powered legs of desk 412 may lower to accommodate seated use when occupancy is detected at 1:09 AM on a Wednesday or alternatively lowered following detecting a transition to an unoccupied state of mat 102 at 12:03 PM (e.g., the user went to lunch and historically works in a seated position following lunch). As can be appreciated, a detected event, such as a transition from occupied to unoccupied or vice versa, may not trigger any action unless it occurs at a specific time or within a particular time window. Additionally, the time or time window may be provided or learned, such as the occurrence of a manual transition (e.g., raising or lowering) that occurs over many observations to develop a probability curve. A particular probably threshold may then be utilized, such as a user who starts work at 8:00 AM, and has a two-standard deviation time window that covers 7:43 to 8:21 and may be considered to be the trigger. However, anything outside of that time window may have a probability that may or may not indicate a particular usage and, accordingly, disabled. For example, a user's workstation may be available to any user if the assigned user does not show up by 8:30 AM.

In another embodiment, a request (manual or automated) to transition desk 412 from standing use to sitting use, or vice versa, may signal computer 414, such as when mounted to support 406 and/or comprising display 408, to alter its operations accordingly. For example, users generally are farther away from monitor 408, when standing, as compared to when seated. Accordingly, transitioning from seated to standing configuration may cause computer 414 to enlarge the text or other display components presented on monitor 408 or, when transitioning to seated, reduce the size of text or other visual components. A computer mouse, keyboard, or other motion sensitive component may then operate at a reduced sensitivity to accommodate a user standing as compared to seated.

In another embodiment, workstation 802 may comprise a processor executing instructions that time a user's mode of operation and provide alerts and/or automatic actions. For example, user 402 may have been seated for three hours and, in response, workstation 802, when embodied as computer 414, may present a pop-up message on display 408, send a text message, or send other communication to user 402 to prompt user 402 to transition to standing. Similarly, a user may "overdue it" if they stand to long and similar alerts may be provided to users who stand beyond a threshold duration. Additionally or alternatively, desk 412 may automatically transition from one mode of use to the other based on time of day, day of week, duration of usage in one mode, aggregate duration over two or more days in one mode, etc.

Mat 102 may be utilized at a dedicated workstation for a particular user. Accordingly, in certain embodiments, mat 102 may assume use thereof is use by the particular user. In other embodiments, mat 102 may be utilized in a shared workspace, such as a conference room or in close proximity to one or more other mats 102. As a result, associating a user with a specific one of mat 102 may be necessary. When communication interface 108 is a wired connection to workstation 802 a user may be identified via sign-in on an application executed on workstation 802. When communication interface 108 is a wireless connection to workstation 802 or workstation 802 is not paired with mat 102, a user may be prompted to identify themselves. For example, one of a plurality of mats 102 may issue a prompt a user to step off then back on. The prompt may be on a specific one of workstations 802 utilized by a known user. If the user complies, then workstation 802 may identify the particular one of mats 102 being utilized by a particular user. Tapping, swiping, or other motions, which may be required to be performed within a particular time window, may be utilized to identify a particular user. An application, such as one executing on server 806, workstation 802, or processor 204 of a designated mat 102 may coordinate authentication/identification so that no two mats 102 request the same authentication/identification activity or, if the same activity is requested, different timeframes are utilized.

Figure 9:
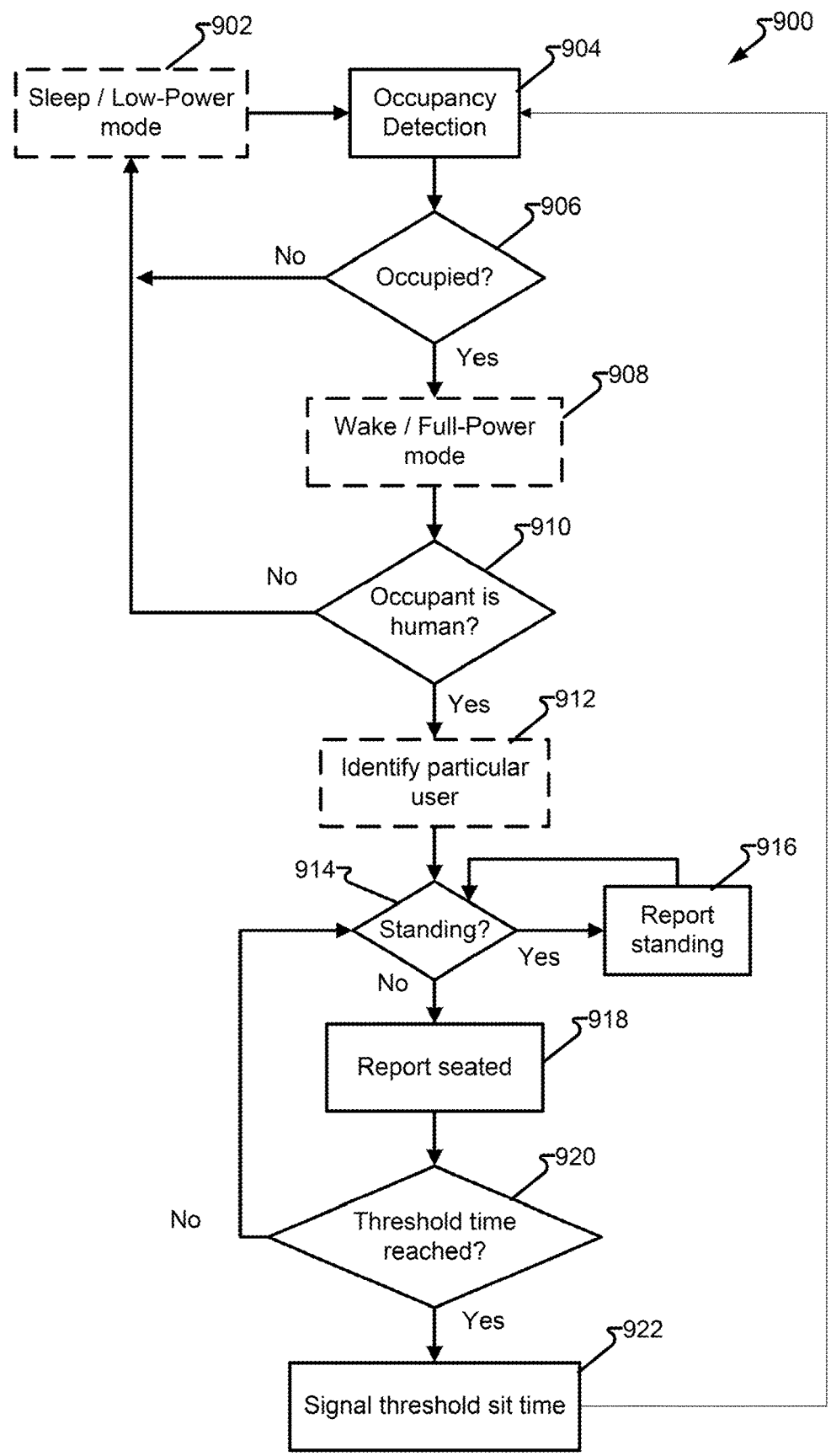
FIG. 9 depicts a first process in accordance with embodiments of the present disclosure.

FIG. 9 depicts process 900 in accordance with embodiments of the present disclosure. In one embodiment, step 904 detects occupancy. Step 904 may detect a lack of any sensed pressure, or a detected pressure below a previously determined threshold, on mat 102 as an absence of occupancy. Step 906, in conjunction with the operations of step 904, then response according to whether occupancy is or is not detected. If step 906 is determined in the negative, process 900 may continue back to step 904 to continue monitoring for occupancy. Optionally, step 902 may initiate or maintain a lower-power mode (e.g., sleep, power-off, etc.) in response to step 906 being determined in the negative. If step 906 is determined in the affirmative, processing may continue to step 910. Optionally, step 908 may initiate or maintain a wake state (e.g., full power). Steps 902 and/or 910 may manage the power utilization of mat 102 or another component, such as computer 414, workstation 802, optional devices 810, etc.

Next, step 910 may identify whether occupancy is caused by a human or non-human (e.g., leg or wheel of a chair, box, etc.). Step 910 may determine that there is a periodic motion, such as a sway, that is associated with human use. Other motions, such as sliding, tapping, etc. may also be associated with a human. Static pressure readings (e.g., no variation over a previously determined period of time) for all or a portion of non-zero pressure readings for a particular portion of mat 102 (e.g., 704), may indicate a "stuck" sensor or a non-human object (e.g., box, leg of a chair, etc.). Accordingly, step 910 may consider such points as non-human and eliminated from further consideration. If no points then remain, step 910 may be determined in the negative. However, if at least one point or portion of non-zero pressure indicates a sway, shift, or other motion associated with a human, step 910 may be determined in the affirmative.

Optionally, step 912 may identify a particular user. A database, such as database 808 or other data storage, may comprise records associating a particular pressure pattern observed by mat 102 with a known user. A known user may be expressly identified (e.g., "John Smith") via login or other data entry means or categorized (e.g., the same user as yesterday, a user different from the previous user, a user different from "John Smith," etc.). Accordingly, if a recognized pressure pattern is encountered, the user may be identified and an action perform in accordance with the user (e.g., place the height of desk 414 at the configured height desired by the identified user, cause a computer to load an associated profile, etc.).

Step 914 determines if the usage of mat 102 is a standing usage or a non-standing usage. Step 914 may determine if portions of pressure on mat 102 that have non-static values (e.g., portions 702) have at least a minimum threshold aggregate weight, position, variations, etc. that indicate a user is standing on mat 102 and, thereby, cause step 914 to be determined in the affirmative. Optionally, step 914 may determine whether the usage is a seated usage. For example, if dynamic portions (e.g., portions 502) fail to provide an aggregated weight associated with a user or a usage pattern that indicates seated use (e.g., one portion, such as 502A, may be decreased without a corresponding increase in another portion, such as 502B, or an corresponding increase in more than two points, such as 504). If step 914 is determined in the affirmative, process 900 may then continue to step 916 whereby the user may be reported as standing. Step 916 may comprise updating a record, terminating a "time seated" timer, signaling a component to alter operations (e.g., raise desk 412 for standing use, etc.).

Figure 10:
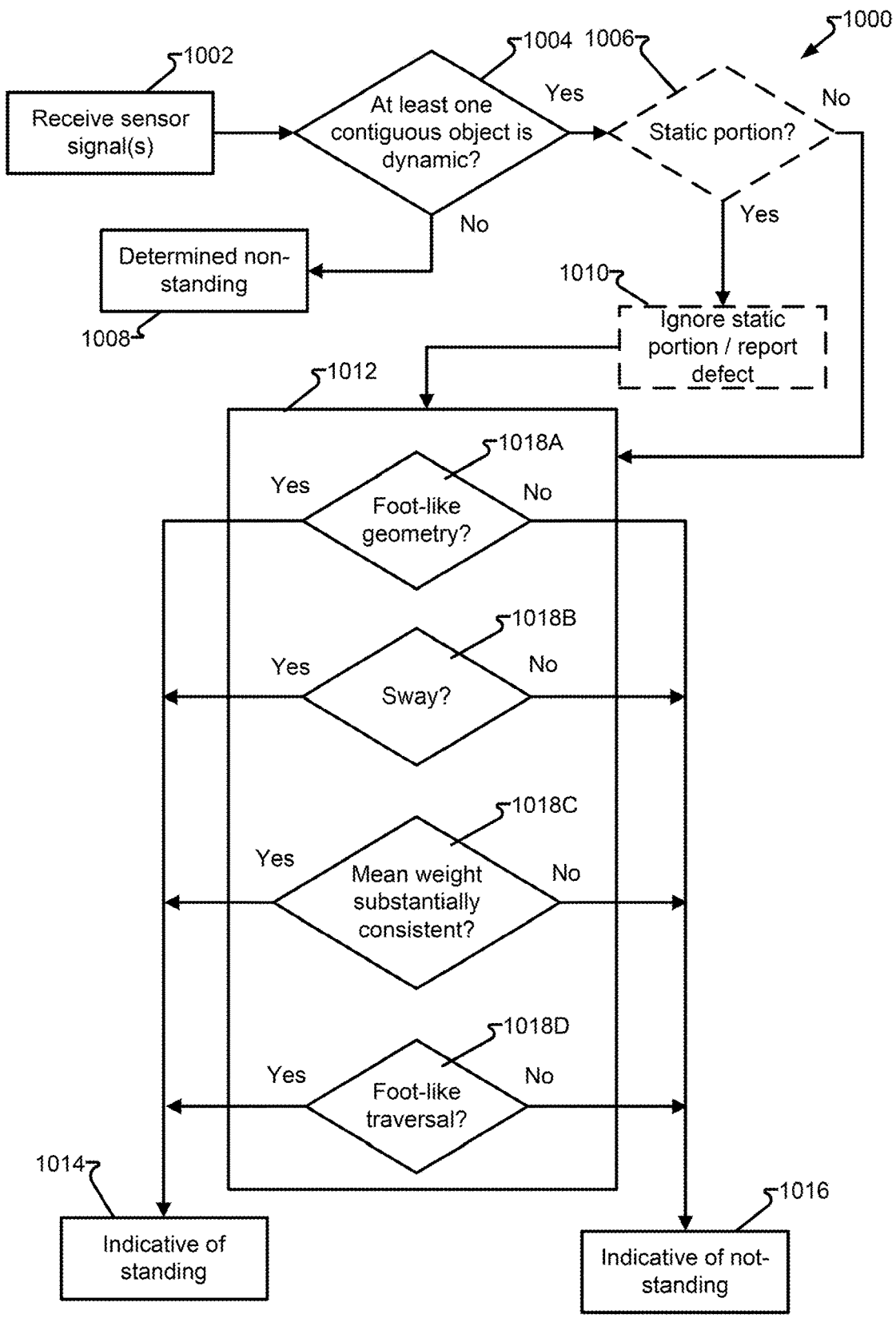
FIG. 10 depicts a second process in accordance with embodiments of the present disclosure.

If step 914 is determined in the negative, process 900 may then continue to step 918 whereby the user is reported as seated. Step 918 may comprise updating a record of time spent seated, start or continue a "time seated" timer, signal a component to alter operation (e.g., lower desk 412 for seated use, etc.). In another embodiment, step 920 determines if the "time seated" exceeds a previously determined threshold. If no, process 900 may continue back to step 914. If step 920 is determinized in the affirmative, step 922 may imitate a signal. The signal may be a message sent to a user (e.g., pop-up message on computer 414, text message, vibration on mat 102, update record, etc.). It should be appreciated that other embodiments, such as resuming process 900 at step 904, 910, and or other point may be provided, such as when step 920 is determined in the negative or following step 922, without departing from the scope of the embodiments. As a further option, time or duration spent seated or standing may be reported and utilized for various triggers, such as a congratulatory notification upon standing for a previously determined duration or having stood for at least a particular number of times in given day, week, etc. Process 900 may operate intermittently, periodically, and/or continually FIG. 10 depicts process 1000 which may comprise, in whole or in part, step of step 914 to determine if a user is standing in accordance with embodiments of the present disclosure. As a further option, process 1000 may comprise additional or alternative steps otherwise provided in process 900. In one embodiment, step 1002 receives signals indicating pressure and/or location of pressure from mat 102.

Next, step 1004 determines that mat 102 comprises at least one portion providing dynamic values. It should be appreciated that the timeframe to determine whether or not a value is dynamic may be selected in accordance with human physiology and what may be utilized to determine a human stance. For example, small motions of a human standing stationary may be detected over a period of a few seconds or less, such as five or ten seconds. A human in a more normal mode, may impart variations observed on mat 102 within one second or less. A pressure sensing area that is entirely static for a longer period of time one minute or more may be determined to be non-human (e.g., box, chair leg, etc.). As a human may occupy mat 102 along with a non-human object (e.g., user standing while a box also rests on mat 102), only dynamically varying portions may be considered further for human occupancy and/or sitting/standing determinations. If step 1004 determines there is not at least one dynamic portion, step 1004 may be determined in the negative and step 1008 determines use is a non-standing use. Step 1008 may further consider the use to be non-use (e.g., lack of occupancy) or static use (e.g., presence of an inanimate object on mat 102). If step 1004 is determined in the affirmative, step 1012 may then be executed. Optionally, steps 1006 and 1010 may be performed. Step 1006 determines if there is a static portion in addition to the at least one dynamic portion. If no, processing may continue to step 1012. If step 1006 is determined in the affirmative, step 1010 may report the object to a user, maintenance personnel, or other system or component, such as to indicate a defect (e.g., "stuck" pressure sensing component) or misuse (e.g., chair or table leg on mat 102). Following step 1010, processing may resume at step 1012.

Step 1012 comprises one or more criteria 1018 utilized to determine if a user is standing or not standing or, additionally or alternatively, seated. Certain criteria 1018 may provide a conclusive determination, such as to override or omit other criteria 1018. For example, criterion 1018C registers only a few pounds that varies to zero—associated with a seated user lifting their foot. Other criteria 1018 may provide support or a lack of support for a particular determination provided by other criteria 1018. For example, criterion 1018A may indicate a foot or shoe-like geometry is pressing on mat 102. However, as feet and shoes vary considerably in their size and geometry (e.g., high-heals versus running shoes versus dress shoes, etc.), such a determination may not be conclusive. However, if criterion 1018B indicates a sway associated with a human standing, the determination may be more certain. Conversely, if criteria 1018 indicates no sway or a weight not associated with a human occupant on mat 102 (e.g., a user left their shoes on the mat), then the confidence that a user is standing may be less certain or discounted entirely. Step 1012 then utilizes the one or more criteria 1018 to determine whether the user is standing, and thereby executing step 1014, or not-standing, and thereby executing step 1016. Steps 1014 and 1016 may cause a component to perform a particular operation, such as raise/lower desk 412, cause workstation 802 to operate in a mode for seated use (e.g., smaller font, accept fine inputs on a mouse or other tactile input component) or standing use (e.g., larger font, ignore fine inputs and only consider coarser inputs on a mouse or other tactile input component).

Criteria 1018 is variously embodied and may include criteria 1018A-D, such as to evaluate wither a foot or shoe-like geometry is detected, sway is detected, a mean weight of dynamic portions is substantially constant, a foot or shoe-like traversal, etc.). It should be appreciated that other criteria may also be implemented. For example, criterion 1018D determines if a sensed portion on mat 102 is foot-like. For example, a linear or curvilinear path may be indicative of a wheel of a chair and, therefore, not a standing user at least with regard to the sensed portion. However, if a sensed portion of mat 102 indicates a user stepping onto mat 102, then the user is, or is likely, standing. In another embodiment, timing or duration is considered. For example, an indication of seated use, when previously determined to be a standing use, or vice versa that lasts for less than three seconds, may be ignored as an anomaly. The specific duration may be selected in accordance with learned behaviors or previously determined threshold values to balance responsiveness with the duration of anomalies.

Figure 11:
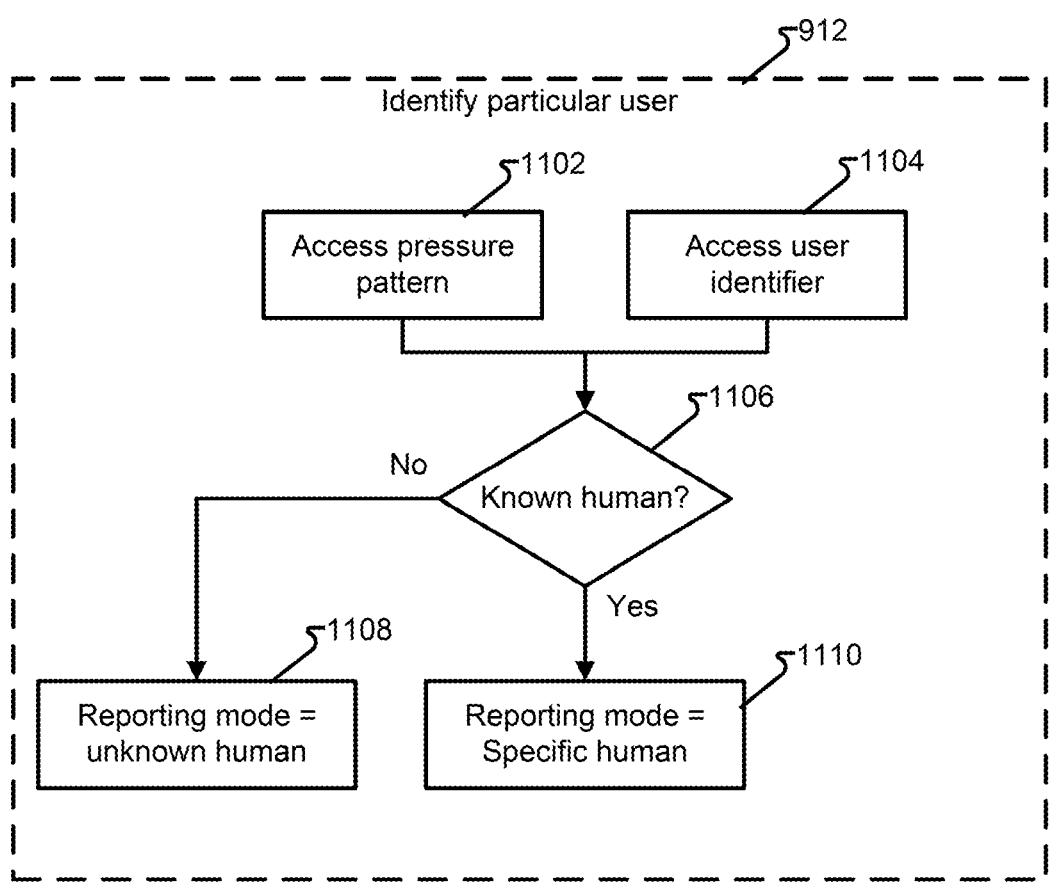
FIG. 11 depicts a third process in accordance with embodiments of the present disclosure.

FIG. 11 depicts process of step 912 in accordance with embodiments of the present disclosure. Step 912 may be executed to determine the identity of a particular human occupant on mat 102. In one embodiment, each of steps 1102 and 1104 are executed. Step 1102 accesses a record associated with a particular pressure pattern observed on mat 102. Step 1104 accesses an identifier of users and associated recorded pressure patterns. Step 1106 determines if the observed pressure patter matches one of the recorded pressure pattern. If step 1106 is determined in the negative, step 1108 is executed whereby operation of mat 102 and/or associated components is performed in a mode associated with an unknown user, such as to prompt the user to sign-in, or otherwise identify themselves, or to operate in an anonymous user-mode. If step 1106 is determined in the affirmative, step 1110 the operation of mat 102 and/or associated components is performed in a mode associated with the identified user, such as to cause a component to be configured in accordance with a setting for the known user.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium, such as a storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A system, comprising:
 a pressure sensing mat comprising a plurality of pressure sensing portions;
 a processor; and
 wherein the plurality of pressure sensing portions provide signals to the processor in accord with a received pressure and location of the pressure on the pressure sensing mat;
 wherein the processor determines that the pressure sensing mat is occupied comprising determining that a subset of the plurality of pressure sensing portions, the subset comprising at least two but less than all of the plurality of pressure sensing portions, indicate an aggregate weight above a threshold weight;
 upon determining the pressure sensing mat is occupied, the processor further determines that the subset indicates occupancy by a user standing comprising the processor determining that the subset is associated with locations of the pressure sensing mat that form a first portion and a second portion, wherein the first portion and second portion are consistent with the geometry of the feet of the user, and further determining that the signals provided by the subset comprises fluctuations in pressure consistent with a human standing; and
 the processor providing a first response, upon determining that the pressure sensing mat is occupied by the user standing and otherwise providing a second response.

2. The system of claim 1, further comprising:
 a component configured to communicate with the processor; and
 wherein:
  the processor is located internally to the pressure sensing mat;
  the pressure sensing mat further comprises a first communication interface in communication with the processor; and the pressure sensing mat communicates with the component, which further comprises a second communication interface, via the first communication interface.

3. The system of claim 1, further comprising:
a component configured to communicate with the processor; and
wherein:
the processor is located internally to the component;
the pressure sensing mat further comprises a first communication interface in communication with the plurality of sensing portions; and
the pressure sensing mat communicates with the component, which further comprising a second communication interface, via the first communication interface.

4. The system of claim 1, wherein the plurality of pressure sensing portions comprise an associated plurality of pressure sensing components in communication with the processor.

5. The system of claim 1, wherein the fluctuations in pressure are consistent with swaying motions of a human standing wherein the average pressure of the fluctuating pressure is substantially constant.

6. The system of claim 1, wherein the processor further determines the source of the occupancy comprises the user standing upon excluding signals from the plurality of pressure sensing portions that indicate a static pressure and the signals not excluded, indicate standing use.

7. The system of claim 1, further comprising:
a component configured to communicate with the processor;
upon the processor determining occupancy does not comprise the user is standing and, in response thereto, initiating a timer; and
upon the timer reaching a previously determined threshold, causing the component to execute a response.

8. The system of claim 7, wherein the response comprises at least one of raising of a desk utilized in conjunction with the pressure sensing mat, or adjusting a setting of a computing device utilized by a user in conjunction with use of the pressure sensing mat.

9. The system of claim 1, further comprising:
a data storage; and
wherein the processor obtains identification of the user and maintains in the data storage the identification of the user and signals associated with the identified user and wherein the signals indicate a sway pattern associated with the user; and
wherein upon determining the associated signals are present, authenticating the user as the user having the identification.

10. The system of claim 1, further comprising:
a component configured to communicate with the processor; and
the processor determining the pressure sensing mat is unoccupied, providing a third response to the component.

11. The system of claim 10, wherein the component, upon receiving the third response triggers a reduced power mode in at least one of the component or at least one attached device.

12. A pressure sensing mat, comprising:
a communication interface to a network;
a supporting structure;
a pressure sensing component supported by the supporting structure and configured to provide signals in accord with a received pressure and location of a plurality of pressure sensing portions of the pressure sensing mat;
a processor determining that the pressure sensing mat is occupied, upon determining that the signals from a subset of the plurality of pressure sensing portions, the subset comprising at least two but less than all of the plurality of pressure sensing portions and that the subset indicates an aggregate weight above a threshold weight;
upon determining the pressure sensing mat is occupied, the processor further determines that the subset indicates occupancy by a user standing comprising the processor determining that the subset is associated with locations that form a first portion and a second portion, wherein the first portion and second portion are consistent with the geometry of the feet of the user, and further determining that the signals provided by the subset comprises fluctuations in pressure consistent with a human standing; and
the processor providing a first response upon determining that the pressure sensing mat is occupied, the processor further determines the source of the occupancy and provides a first response, when the source of the occupancy is determined to comprise a user standing and a second response, when the occupancy is determined not to comprise the user standing.

13. The pressure sensing mat of claim 12, wherein the processor determines the source of the occupancy does not comprises the user standing upon determining the signals from the first subset of the plurality of pressure sensing portions and the signals from the second subset of the plurality of pressure sensing portions each indicate the pressure sensing mat is being used by the user that is seated in a chair occupying the pressure sensing mat.

14. The pressure sensing mat of claim 12, wherein the processor provides the second response upon determining the signals from the pressure sensing component indicate non-human use of the pressure sensing mat.

15. A method, comprising:
detecting pressure on a pressure sensing mat;
analyzing signals from portions of the pressure sensing mat;
determining whether the pressure sensing mat is occupied comprising determining whether signals from a subset of pressure sensing portions, wherein the subset comprises at least two but less than all of the pressure sensing portions, indicate an aggregate weight above a threshold weight;
upon determining the pressure sensing mat is occupied, determining that the source of the occupancy is a user standing upon further determining that the subset is associated with locations of the pressure sensing mat that form a first portion and a second portion, wherein the first portion and the second portion are consistent with the geometry of the feet of the user, and further determining that the signals provided by the subset comprises fluctuations in pressure consistent with a human standing; and;
outputting, to a component, a first response when the source of the occupancy is determined to comprise a user standing; and
outputting, to the component, a second response when the source of the occupancy is not determined to comprise the user standing.

16. The method of claim 15, wherein the component comprises a data reporting device operable to receive the first response and the second response from a plurality of pressure sensing mats comprising at least the pressure sensing mat.

17. The method of claim 15, further comprising:
modifying a computer workstation to be in a first configuration, in response to receiving the first response; and
modifying the computer workstation in a second configuration, in response to receiving the second response; and
wherein the first configuration is associated with standing use of the computer workstation and the second configuration is not associated standing use.

18. The method of claim 15, further comprising:
in response to receiving the second response, the component, determining whether the occupancy does not comprise the user standing for more than a previously determined period of time and, if so, performs a prompting selected to alert the user to transition to standing use.

19. The method of claim 15, wherein:
the component comprises a setting to configure the computer workstation for one of seated use or standing use; and
upon the component receiving the first response, while the setting is configured for seated use, causing the setting to be modified for standing use; and
upon the component receiving the second response, while the setting is configured for standing use, causing the setting to be modified for seated use.

20. The method of claim 15, wherein
outputting the second response further comprises, outputting the second response upon determining that the analyzed signals indicate that the pressure sensing mat comprises a static pressure that is non-zero.

* * * * *